United States Patent [19]

Haraikawa et al.

[11] 4,228,875
[45] Oct. 21, 1980

[54] MECHANICAL DISC BRAKE

[75] Inventors: Tetsuo Haraikawa, Funabashi; Tomio Hasaka, Kawasaki, both of Japan

[73] Assignee: Tokico Ltd., Kanagawa, Japan

[21] Appl. No.: 69,108

[22] Filed: Aug. 21, 1979

Related U.S. Application Data

[63] Continuation of Ser. No. 851,587, Nov. 14, 1977, abandoned.

[30] Foreign Application Priority Data

Nov. 19, 1976 [JP] Japan .................. 51-155521[U]

[51] Int. Cl.³ .................................... F16D 55/224
[52] U.S. Cl. ................................ 188/72.7; 74/18.2; 74/99 A; 188/71.1; 188/71.7; 188/196 M
[58] Field of Search ............... 188/72.7, 71.9, 196 M, 188/72.8, 71.1, 71.7, 196 BA; 74/18.1, 18.2, 99, 99 A, 107, 567

[56] References Cited

U.S. PATENT DOCUMENTS

| | | | |
|---|---|---|---|
| 3,344,891 | 10/1967 | Thirion | 188/72.7 X |
| 3,365,031 | 1/1968 | Swift | 188/72.7 X |
| 4,022,299 | 5/1977 | Haraikawa | 188/71.9 |
| 4,162,720 | 7/1979 | Haraikawa | 188/72.7 X |

FOREIGN PATENT DOCUMENTS 1144306 3/1969 United Kingdom ............... 188/72.7

*Primary Examiner*—George E. A. Halvosa
*Attorney, Agent, or Firm*—Wenderoth, Lind & Ponack

[57] ABSTRACT

A mechanical disc brake includes a caliper floatingly supported on a stationary member, and a force converting mechanism mounted on the caliper and comprising a rotatable member rotatable in response to a rotary input force, an inclined surface formed on one side of the rotatable member, a ramp member disposed adjacent to the rotatable member with an inclined surface formed thereon for cooperating with the inclined surface of the rotatable member, and at least one ball member interposed between the inclined surfaces for reducing frictional resistance in converting the rotary input force into a linear output force. A dust cover is disposed to cover the ball and the inclined surfaces and has a first end mounted on the rotatable member and a second end mounted on the ramp member.

5 Claims, 3 Drawing Figures

MECHANICAL DISC BRAKE

This is a continuation of application Ser. No. 851,587, filed Nov. 14, 1977, now abandoned.

BACKGROUND OF THE INVENTION

This invention relates to mechanical disc brakes and, particularly, to disc brakes of the floating caliper type including a force converting mechanism for converting a rotary input force into a linear output force which is directly applied to one of the friction pads, and a caliper slidably mounted on a stationary member for transmitting the reaction of the output force to the other friction pad.

Various disc brakes of the type aforementioned are known to the public and, one of co-inventors of the present invention has also proposed similar disc brakes in Japanese Patent Application Nos. 17796/1976 and 17797/1976 (which are now disclosed to the public under Japanese Patent Disclosure Nos. 101368/1977 and 101369/1977 respectively).

Usually, the force converting mechanism includes a rotatable member rotatably mounted on a housing of the disc brake and adapted to receive the input force in the form of torque, a ramp member mounted in the housing for moving relatively toward and away from to the rotatable member, co-acting surfaces formed on the rotatable member and the ramp member and being inclined with respect to the direction of relative movement between both members, and at least one force transmitting member interposed between the inclined surfaces for transmitting force therebetween to reduce frictional resistance caused therefrom.

Conventionally, a dust preventing boot has been provided with the opposite ends thereof secured to the housing and the rotatable member to prevent ingress of dust or water into the force converting mechanism, and the boot mounting operation has been effected after the force converting mechanism has been installed in the housing. However, the space between the housing and the rotatable member is usually narrow and the boot has been secured to a specified small area portion of the housing. Thus, the boot mounting operation has been troublesome and time consuming. Further, it has been necessary to use additional parts such as a retaining spring or the like to secure the boot to the housing, thus complicating the configuration of the boot, increasing manufacturing costs and increasing the difficulty of the mounting operation.

BRIEF SUMMARY OF THE INVENTION

An object of the present invention is to eliminate the aforementioned shortcomings by providing a mechanical disc brake of a type whereby it is possible to pre-assemble the force converting mechanism with a boot attached thereto prior to the operation of assembling the mechanism into the housing. Thus it is possible to omit the boot assembling operation which has been effected in a narrow space and to reliably secure the boot.

BRIEF DESCRIPTION OF THE DRAWINGS

Further objects and advantages of the present invention will now be described in detail with reference to the attached drawings, in which.

DETAILED DESCRIPTION OF THE PREFERRED EMBODIMENT

Figure 1:
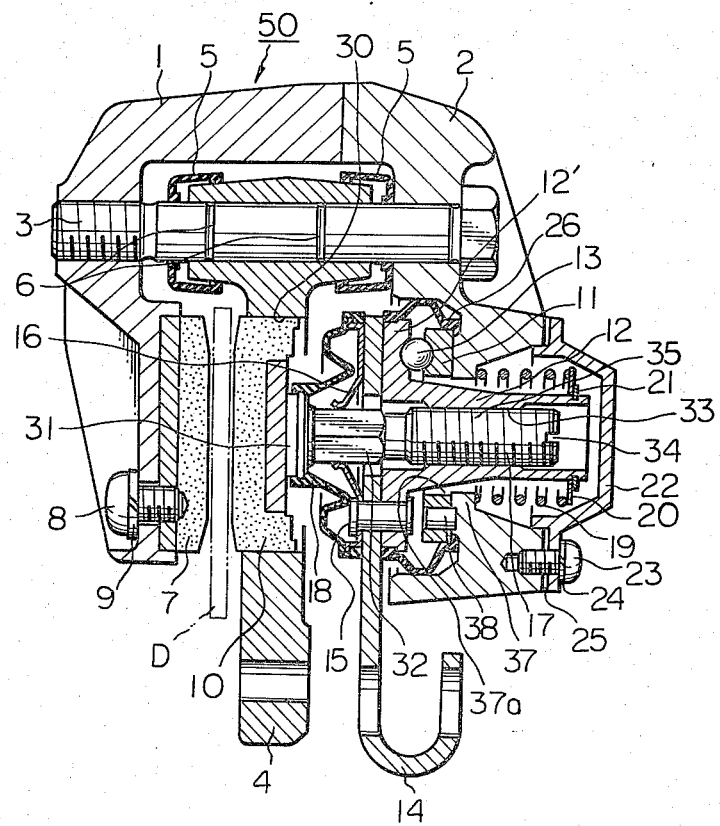
FIG. 1 is a longitudinal cross-sectional view of a disc brake exemplifying the present invention.

The disc brake shown in the drawings comprises a caliper 50 formed of a housing 1 integrally connected with a housing 2 by a pair of bolts 3 only one of which is shown in FIG. 1. The bolts 3 slidably extend through a bracket 4 which is located between the housings 1 and 2 and is adapted to be secured to a stationary part of a vehicle. O-rings are fitted on the bolt 3 to prevent leakage of lubricant enclosed between the bolt 3 and an opening of the bracket 4 receiving the bolt 3. The opposite ends of the opening are protected by boots to prevent ingress of foreign materials into the sliding surfaces of the bolt and the bracket. Friction pads 7, 10 are disposed on the opposite surfaces of a disc D which is rotatable conjointly with a road wheel of the vehicle. The friction pad 7 is secured to the housing 1 by a screw 8 and a spring washer 9, while, the friction pad 10 is slidably positioned within an opening 30 formed in the bracket 4. The rear side of the friction pad 10 is engaged by a stepped enlarged diameter portion 31 formed on the distal end of a push-rod 17.

The push-rod 17 has a rotation retaining portion 32 having a polygonal cross-section such as a quadrate or a hexagon on the rear of the enlarged diameter portion 31, an adjusting screw-thread portion 35 on the rear of the portion 32, and a slit 34 in the rear end of the rod 17.

The screw-thread portion 35 is engaged screw-threadingly by a screw-thread portion 33 of a rotatable member or a linear output generating member 12 constituting one component of a force converting mechanism which converts a rotational input force into a linear output force. The force converting mechanism converts, as known by those skilled in the art, a rotational input force applied to a lever 14 through a cable or the like (not shown) into a linear output force by means of a rotatable and linearly movable member 12, at least one (preferably three or more) steel ball 13, and a ramp member 11 stationarily mounted on the housing 2 by at least one pin 38. The steel ball 13 is received in complementary shaped grooves formed in adjacent surfaces of the members 11 and 12' and extending in a direction inclined with respect to the rotational and linear movements of the member 12 to reduce frictional resistance in converting the direction of the force. A leaf spring 16 integrally secured to the lever 14 and the rotatable member 12 by a plurality of rivets 15 (only one of which is shown in FIG. 1) resiliently engages with the outer periphery of the rotation retaining portion 32 of the push rod 17. A dust preventing boot 18 is mounted between the outer peripheral portion of the leaf spring 16 and the stepped enlarged diameter portion 31 of the rod 17 to prevent ingress of foreign materials such as dust or the like. In the illustrated embodiment the rotatable member is formed of an integral member having a screw-thread portion 12 and an inclined surface portion 12', but these portions may be formed on separate members as shown in Japanese Patent Application No. 17797/1976, for example.

The rotatable member 12 extends into the housing 2 through an opening 37a formed in a stepped portion 37 of the housing 2, and a stop ring 21 is fitted on the inner end of the member 12 to retain an annular plate 20. A coil spring 19 is mounted between the plate 20 and the rear surface of the stepped portion 37 to urge the member 12 against the ramp member 11 through the steel balls 13.

In operation, when the lever 14 is rotated by a cable or the like, a thrust in a direction towards the disc D is generated in the rotatable member 12 by the force converting mechanism, and the friction pad 10 is urged against the rightside surface of the disc by the thrust transmitted through the rod 17. Reaction force acting on the ramp member 11 in the rightward direction in the drawing is transmitted through the housings 2 and 1, the bolts 3 and the friction pad 7 on the leftside surface of the disc D, thereby effecting a braking action.

When the friction pads are worn excessively, the rotating stroke of the lever 14 in applying a braking action will increase accordingly, and at that time a cover plate 22, normally secured to the rightside surface of the housing 2 by means of a packing 25, washers 24 and screws 23, is removed, and a suitable tool such as a driver or the like is inserted into the slit 34 to move the rod 17 toward the disc D for adjusting the clearance between the disc D and the friction pads 7 and 10.

Figure 2:
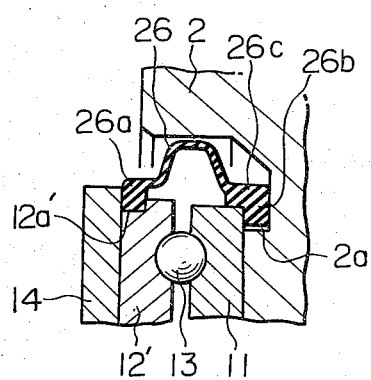
FIG. 2 is an enlarged view of the essential portion of FIG. 1.

A dust cover or boot 26 is, according to the present invention, disposed between the rotatable member 12' and the ramp member 11 for preventing ingress of dust or the like into the force converting mechanism. As shown in FIG. 2, a cut-out portion 12'a is formed in the outer periphery of the rotatable member 12' for receiving one end or the base portion 26a of the boot 26 therein. The base portion 26a is fitted on the cut-out portion 12'a and is clamped in its position by the lever 14. An annular recess 2a is formed in the housing 2 and the other end portion 26b of the dust boot 26 is clamped resiliently between the recess 2a and the ramp member 11 as shown. A cut-out portion similar to the cut-out portion 12'a may be formed in the ramp member 11 in place of the recess 2a.

Figure 3:
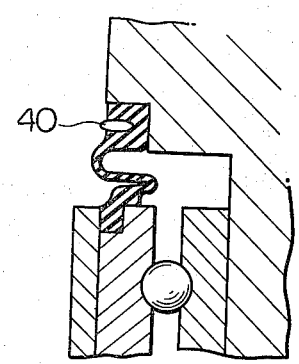
FIG. 3 is a view similar to FIG. 2 but showing the construction of prior art disc brake.

In assembling the boot 26 on the force converting mechanism, the boot is firstly assembled on the rotatable member 12' with one end portion 26a fitted on the cut-out portion 12'a and clamped resiliently by the lever 14. Secondly, the ramp member 11 is mounted on the rotatable member 12' with the steel balls 13 arranged therebetween, and the other end portion 26b of the boot 26 is fitted around the outer periphery of the ramp member 11 with an increased thickness portion 26c of the boot 26 engaging around the outer circumference of the ramp member 11 and the end portion 26b engaging with the rightside surface of the ramp member 11, thereby forming a sub-assembly. The sub-assembly formed of the ramp member 11, the balls 13, the rotatable member 12, the lever 14 and the boot 26 is then fitted into the housing 2, and retained in its position by the spring 19. Since the thickness of the end portion 26b of the boot 26 is larger than the axial dimension of the recess 2a, the end portion 26a is resiliently clamped between the recess 2a and the ramp member 11. Therefore, the boot 26 can easily and reliably be assembled into the housing 2 when the force converting mechanism is assembled into the housing 1, thus eliminating the troublesome and time consuming assembling operation which has been required in prior art disc brakes and, moreover, retaining means such as an annular spring 40 shown in FIG. 3 is not necessary to retain the dust boot in its assembled position.

Further, the opposite end portions of the boot can be resiliently clamped, and thus, ingress of dust or rain can be reliably prevented.

What is claimed is:

1. A mechanical disc brake for a vehicle, said brake comprising:

a stationary member adapted to be secured to a nonrotatable portion of a vehicle;

a caliper adapted to straddle a portion of the periphery of a rotatable disc and including first and second portions adapted to be positioned on opposite sides of the disc, said caliper being slidably supported by said stationary member for sliding movement in a direction parallel to an axis of the disc, said first portion of said caliper including an integral housing having an opening extending therethrough, said opening having a first end adapted to face the disc and a second end adapted to face away from the disc;

force converting means, mounted within said opening of said housing, for receiving a rotary input force, for converting said rotary input force into a linear output force, and for applying said linear output force to brake pads to cause such brake pads to be moved toward the disc, said force converting means comprising a rotatable member positioned within said opening of said housing and having extending therethrough a threaded passage, means, separate from said rotatable member, for rotating said rotatable member about an axis parallel to the axis of the disc, a separate ramp member fixed to said housing at a position adjacent said rotatable member, said rotatable member and said ramp member having facing inclined surfaces, at least one ball member positioned between said facing inclined surfaces, and a push rod extending through and in threaded engagement with said threaded passage through said rotatable member, said push rod having a first end adapted to engage a first brake pad, a polygonal cross-sectioned rotation retaining portion adjacent said first end of said push rod and a second end adjacent said second end of said opening in said housing, such that upon rotation of said rotatable member with respect to said ramp member, said facing inclined surfaces and said at least one ball member cooperate to impart said linear output force to said rotatable member and to said push rod;

a first dust cover positioned to close the space between said facing inclined surfaces and to cover said at least one ball member, said first dust cover having first and second opposite end portions, said first end portion being sealingly mounted on an outer circumference of said rotatable member, and said second end portion being resiliently mounted on an outer circumference of said ramp member and resiliently clamped between said ramp member and said housing;

a rotation control leaf spring fixed to said rotating means, said leaf spring having an inner periphery extending toward said first end of said push rod and resiliently engaging said rotation retaining portion of said push rod, and said leaf spring having an outer periphery; and a second dust cover positioned to cover a space between said first end of said push rod and said rotating means and rotatable member, said second dust cover having first and second opposite end portions, said first end portion of said second dust cover sealingly surrounding said push rod at a position adjacent said first end thereof, and said second end portion of said second dust cover sealingly surrounding said outer periphery of said leaf spring.

2. A brake as claimed in claim 1, wherein said rotating means comprises a separate lever fixed to said rotatable member, and said first end portion of said first dust cover is resiliently clamped between said lever and said rotatable member.

3. A brake as claimed in claim 1, wherein said linear output force is adapted to move said rotatable member and said push rod toward the disc.

4. A brake as claimed in claim 1, wherein said second end of said push rod includes tool receiving means for rotating said push rod, such that said push rod may be rotated with respect to said rotatable member.

5. A brake as claimed in claim 1, wherein said second end portion of said first dust cover includes an axially extending flange portion resiliently engaging the outer circumference of said ramp member and a radially extending flange portion resiliently positioned within an annular groove defined by adjacent surfaces of said ramp member and said housing.

* * * * *